United States Patent Office 3,243,520
Patented Mar. 29, 1966

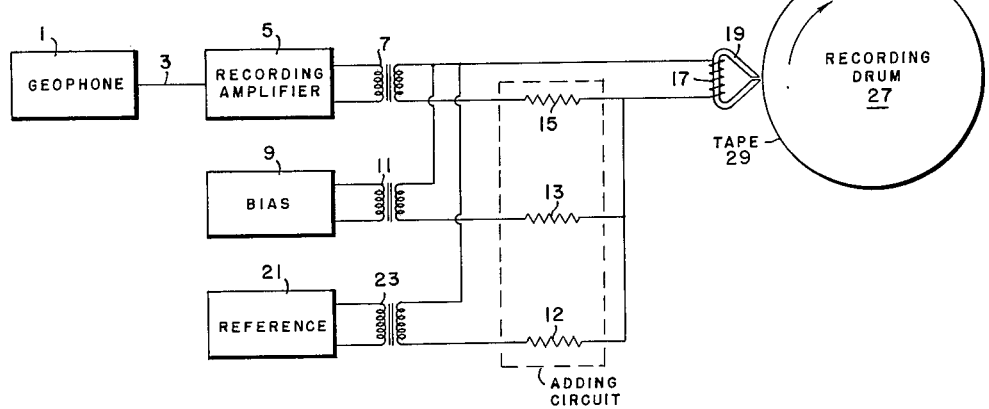

3,243,520
MAGNETIC RECORDATION OF DATA
Sidney A. Martin, Jr., Houston, Tex., assignor, by mesne assignments, to Esso Production Research Company, Houston, Tex., a corporation of Delaware
Filed Oct. 2, 1961, Ser. No. 142,414
2 Claims. (Cl. 179—100.2)

This invention relates to magnetic recording, and more particularly to the direct recording of data and information on magnetic tape as opposed to modulation recording systems.

Magnetic recording is particularly adapted for recordation of data and information for the following reasons:

(1) Ease of reproduction. Magnetic recording permits repeated reproduction of the recorded subject matter without loss of fidelity.

(2) Wide dynamic response. A dynamic range of 50 to 60 db is not unusual in magnetic recording systems.

(3) Large amounts of information can be recorded on a relatively small, easily stored recording medium.

Magnetic recording is particularly useful in connection with seismography. In the usual system for seismic observation, it is necessary either to record each of a multiplicity of geophone output signals simultaneously (see U.S. Patent No. 2,946,393—Hawkins), or to record the output signal or signals of a geophone or geophone array time after time in side-by-side relationship after initiation of each of a plurality of seismic impulses (see U.S. Patent No. 2,851,121—McCollum). It has become the practice to use magnetic tape rather than magnetic wires or drums for the purpose of recording geophone output signals in connection with seismic observations.

The recording of seismic data on magnetic tape has offered many improvements over the old photographic recording. One way in which seismic data is recorded on magnetic tape is called direct recording. In this type of recording the electric current representing the "signal" or "data" is mixed with a "high frequency bias" at the recording head. This type of recording is in wide use but imperfections in the machine present certain limitations in its use.

If, for example, a 100 cycle sine wave signal was simultaneously recorded on all channels of a 24 channel tape system of the type conventionally used for seismic recording, it might be expected that all 24 channels would be identical on playback. However, such is not the case. Generally, even on a "good" machine there will be differences in amplitude of up to the order of 25%; there may be differences in phase of more than 180°.

It is normally accepted that most useful seismic information is contained in a frequency band of the order of from 10 to 200 cycles, although under certain special cases it may be desirable to record frequencies outside this band. It is generally accepted that a timing accuracy of the order of one millisecond (1/1000 second) is desirable for the recording and computing of seismic data. Relative amplitude information is becoming more important each day as new types of data processing are developed.

In the recordation of data, such as seismic data, it is manifest that variations between the waveforms of a recorded signal and the reproduced signal corresponding thereto are completely undesirable. In direct recording magnetic tape systems it is unfortunate that waveform variations between corresponding portions of recorded and reproduced signals may be 25% or more as the result of (1) differences in tape oxide thickness, and (2) differences in magnetic recording heads and reproduction heads which cause (a) effective differences in bias, (b) effective differences in the signal as recorded, and (c) different reproduced signal amplitudes.

In accordance with the teachings of the present invention, a signal to be recorded on magnetic tape is mixed or added to a constant amplitude, constant frequency alternating current reference signal having a frequency substantially greater than the maximum frequency component of the data signal to be recorded. Preferably, the frequency of the reference signal is near the upper cutoff frequency of the magnetic recording system. The combined signal is recorded on the magnetic recording medium, e.g., the magnetic tape, to produce a record trace. Signals reproduced from the record trace are separated into the data component thereof and the reference signal component thereof. The amplitude of the data signal component is thereafter varied inversely with variations in the amplitude of the reference signal component, thereby producing an output signal having a waveform substantially identical to the waveform of the original data signal.

Objects and features of the invention that are not apparent from the above description will become evident upon consideration of the following detailed description thereof when taken in connection with the accompanying drawing, wherein:

FIG. 1 is a schematic diagram of data signal recording system according to the present invention; and FIG. 2 is a schematic diagram of a system for reproducing a data signal previously stored by the apparatus of FIG. 1, according to the present invention.

With reference now to FIG. 1, there is shown a source of variable amplitude data signal 1 which may be a geophone or other variable amplitude signal source. If 1 is assumed to be a geophone, it is to be understood that a plurality of geophones, interconnected so as to provide a single output signal in the manner shown in U.S. Patent No. 2,759,551—Carlisle, may be utilized. It is further to be understood that not just one geophone or geophone array need be used, but that a plurality of such arrays can and probably would be used in making seismic observations. This is in accordance with standard practice and will not be further dealt with herein. The data signal is transmitted to a recording amplifier 5 on line or channel 3.

There is also provided a recording bias source 9 for the purpose of providing a reference magnetization level about which the data signal from source 1 fluctuates, and a reference signal source 21. In accordance with standard practice, the bias source 9 may be an alternating current source. The reference signal source 21 provides a constant frequency, constant amplitude alternating current signal. As mentioned above, the frequency of the signal from source 21 is substantially higher than the frequency of the highest frequency component of the variable amplitude data signal source 1.

There is also provided a recording drum 27 on which is mounted a recording tape 29. It is to be understood that the recording drum and tape shown in the drawing are only exemplary and that dual reel tape transport systems, as illustrated in the Hawkins patent supra, or any other known type of transport system, may be utilized. Positioned in magnetic recording relationship with the tape 29 is a recording head 19 having a very small air gap. Magnetic flux will tend to pass through the magnetic tape 21 rather than through the gap so as to magnetize a record trace on the tape in accordance with the intensity of the magnetic field passing through the recording head 19. The recording head 19 may be of conventional design. A coil 17 is wound on the core of the magnetic head 19 so as to produce a magnetic field therein variable in accordance with variations in the electrical current through coil 17.

The output signals from recording amplifier 5, from bias source 9, and from reference source 21 are coupled to the recording coil 17 of the recording head 19 by means of isolating transformers 7, 11, and 23, respectively, and by means of an adding circuit comprising a resistor 15 in series circuit relationship with the secondary of transformer 7, a resistor 13 in series circuit relationship with the secondary of transformer 11, and a resistor 12 in series circuit relationship with the secondary of transformer 23. Thus, the amplitude of the current flowing through recording winding 17 of recording head 19 will be determined by the sum of the voltages appearing across the secondaries of transformers 7, 11, and 23.

In FIG. 2, magnetic tape 29 is shown mounted on a playback drum 31 which may be similar in design to recording drum 27. In some applications it may be desirable that the recording drum be used for playback. In magnetic detecting relationship with the tape 29 is mounted pickup head 35 having a pickup winding 37 associated therewith. Pickup 35 may be similar or substantially identical in design to the recording head 19. Variations in magnetization of a trace recorded on tape 29 will produce variations in magnetic flux in pickup 35 so as to induce an output voltage in winding 37 in accordance with the variations in magnetization of the trace on tape 29. The output signal from pickup winding 37 is applied to a preamplifier 39 whereat it is amplified to a desired amplitude. The output signal from preamplifier 39 is applied to a filter 42 by means of lead 41, and to a filter 45 by means of lead 43. The filter 42 is preferably a low-pass filter adapted to eliminate all signals having a frequency higher than the maximum frequency to be expected from the data signal source 1. Filter 45 is adapted to pass signals having the frequency of the output signal of reference signal source 21 and to exclude signals having the frequencies to be expected from bias source 9 and data signal source 1. Preferably, filter 45 is a bandpass filter having a very narrow passband.

The output signal from filter 42 is applied to a variable gain amplifier 53 through lead or channel 55. The variable gain amplifier 53 is adapted to produce an output signal on line or channel 57. The amplitude of gain control amplifier 53 is controlled by the amplitude of signals applied to channel 51 coupled thereto. The output signal from amplifier 53 appearing on channel 57 is applied to a visual recorder 61 and it recorded on a visual recording medium thereby.

The output signal from filter 45 is applied to variable gain amplifier 53 by means of reference amplifier 49 in such a manner that the gain of amplifier 53 varies in inverse proportions to the output signal from filter 45. Reference amplifier 49 is adjusted so that the waveform of the signal appearing on output channel 57 from amplifier 53 is substantially identical to the waveform of the signal appearing at the output of geophone 1.

In operation, the reference signal source 21 is adjusted so that the amplitude across the secondary of transformer 23 is between 0.5% and 5% of the amplitude of the signal appearing across transformer 7. The combined signal is recorded as a single record trace on tape 29. It is manifest that by moving the recording head laterally across the tape, a plurality of traces can be produced in side-by-side relationship, or that more than one recording head may be used with other systems designed substantially as shown in FIG. 1 so as to simultaneously produce a multiplicity of record traces.

Any variations in the tapes themselves or vibrations of the recording or playback heads will, in effect, modulate the signals recorded on the tape. The signals will be proportionately modulated so that any operation on the signals that restores the reference signal to its original wave shape will restore the data signal to its original wave shape.

On playback, the output signal from the winding 37 or recording head 35 is separated into its data signal component by filter 42 and its reference signal component by filter 45. The data signal will appear on channel 55 and the reference signal component will appear on channel 47. The gain control amplifier 53 will amplify the signal appearing on channel 55. The amplitude of the signal appearing on channel 57 will vary inversely proportional to the signal appearing on channel 47. Therefore, any variations in the signal appearing on channel 47 will oppositely affect the signal appearing on channel 57, i.e., increases in the amplitude of the signal on channel 47 will decrease the amplitude of the signal appearing on channel 57, and vice-versa. Thus, variations in the amplitudes of the components produced by the causes enumerated above will be compensated in such a manner that the waveform of the signal appearing on channel 57 will be substantially identical to the waveform of the signal appearing on channel 3.

The invention is not necessarily to be restricted to the specific structural details, arrangement of parts, or circuit connections herein set forth, as various modifications thereof may be effected without departing from the spirit and scope of the invention.

The objects and features of the invention having been completely described, what I wish to claim is:

1. The method of storing and reproducing a variable amplitude electrical signal on magnetic tape comprising:
  adding to the variable amplitude signal a constant amplitude, constant frequency reference signal having a frequency substantially greater than the maximum frequency component of said variable amplitude signal, to produce a combined signal;
  recording the combined signal on the magnetic medium to produce a record trace;
  producing a secondary electrical signal from said record trace putatively identical to said combined signal;
  separating the components of said secondary signal having the frequency of the reference signal from the components of said secondary signal having the frequency components of said variable amplitude electrical signal;
  electrically amplifying said components of said secondary signal having the frequency components of said variable amplitude signal; and
  varying the amplification of said components of said secondary signal having the frequency components of said variable amplitude signal inversely with substantially simultaneous variations in the amplitude of the components of said secondary signal having the frequency of the reference signal.

2. The method of claim 1 wherein the amplitude of the variable amplitude signal is between 20 and 200 times the amplitude of the reference signal.

References Cited by the Examiner

UNITED STATES PATENTS

| 2,945,212 | 7/1960 | Shekels | 340—174.1 |
| 2,957,953 | 10/1960 | Woodward | 179—100.2 |
| 3,012,234 | 12/1961 | Burns | 340—174.1 |

IRVING L. SRAGOW, *Primary Examiner.*

BERNARD KONICK, *Examiner.*

R. J. McCLOSKEY, P. F. ROTH, *Assistant Examiners.*